(12) United States Patent
Peloux

(10) Patent No.: US 10,274,752 B2
(45) Date of Patent: Apr. 30, 2019

(54) METHOD FOR PROVIDING TO AN EYE OF A WEARER A CUSTOMIZABLE OPHTHALMIC LENS AND ASSOCIATED ACTIVE SYSTEM OF VISION

(71) Applicant: Essilor International, Charenton-le-Pont (FR)

(72) Inventor: Marius Peloux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/695,644

(22) Filed: Sep. 5, 2017

(65) Prior Publication Data

US 2018/0017812 A1 Jan. 18, 2018

Related U.S. Application Data

(63) Continuation of application No. 14/419,472, filed as application No. PCT/EP2013/066335 on Aug. 2, 2013, now abandoned.

(30) Foreign Application Priority Data

Aug. 3, 2012 (EP) .................................... 12305974

(51) Int. Cl.
G02C 7/08 (2006.01)
(52) U.S. Cl.
CPC .................... *G02C 7/083* (2013.01)
(58) Field of Classification Search
CPC ........ G02C 7/022; G02C 7/081; G02C 7/083; G02C 7/025; G02C 7/027
See application file for complete search history.

(56) References Cited

U.S. PATENT DOCUMENTS 5,815,233 A 9/1998 Morokawa et al.
2005/0237485 A1 10/2005 Blum et al.
(Continued)

FOREIGN PATENT DOCUMENTS

FR 2972814 9/2012
WO WO 03/077012 9/2003
(Continued)

OTHER PUBLICATIONS

Peloux, "Shape of Diffraction Orders of Centered and Decentered Pixelated Lenses", Appl. Opt. 49(6):1054-1064, 2010.

*Primary Examiner* — Darryl J Collins
*Assistant Examiner* — Journey F Sumlar
(74) *Attorney, Agent, or Firm* — Oblon, McClelland, Maier & Neustadt, L.L.P.

(57) ABSTRACT

Providing to an eye a customizable ophthalmic lens comprising a transparent set of electroactive cells (24) juxtaposed to a lens surface for providing an optical phase-shift distribution function. The method includes providing (402) a reference phase-shift distribution function adapted to provide a given dioptric function $DF(\alpha, \beta)$; determining (404) the actual gaze direction $(\alpha_a, \beta_a)$; choosing (406) a reference gaze direction $(\alpha_R, \beta_R)$; calculating (408) an actual point $P_a$ at the intersection between the actual gaze direction and the transparent set of electroactive cells, and a reference point $P_R$ at the intersection between the reference gaze direction and the transparent set of electroactive cells; calculating (410) a modified phase-shift distribution function by shifting the reference phase-shift distribution function according to a vector $\overrightarrow{P_R P_a}$; and activating (412) the electroactive cells according to the modified phase-shift distribution function.

16 Claims, 3 Drawing Sheets

(56) References Cited

U.S. PATENT DOCUMENTS

| | | |
|---|---|---|
| 2008/0170203 A1 | 7/2008 | Esser et al. |
| 2012/0050682 A1 | 3/2012 | Bonnin |
| 2013/0069258 A1 | 3/2013 | Ballet |
| 2014/0002911 A1 | 1/2014 | Peloux |

FOREIGN PATENT DOCUMENTS

| | | |
|---|---|---|
| WO | WO 2010/130932 | 11/2010 |
| WO | WO 2011/144852 | 11/2011 |

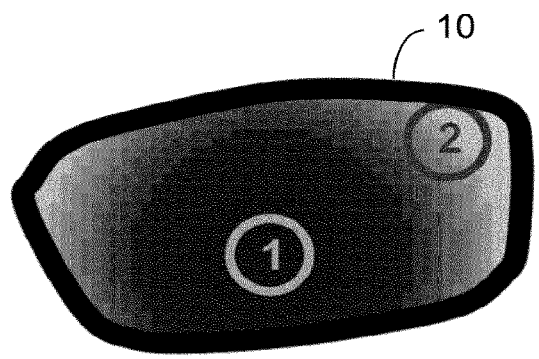
Fig. 1
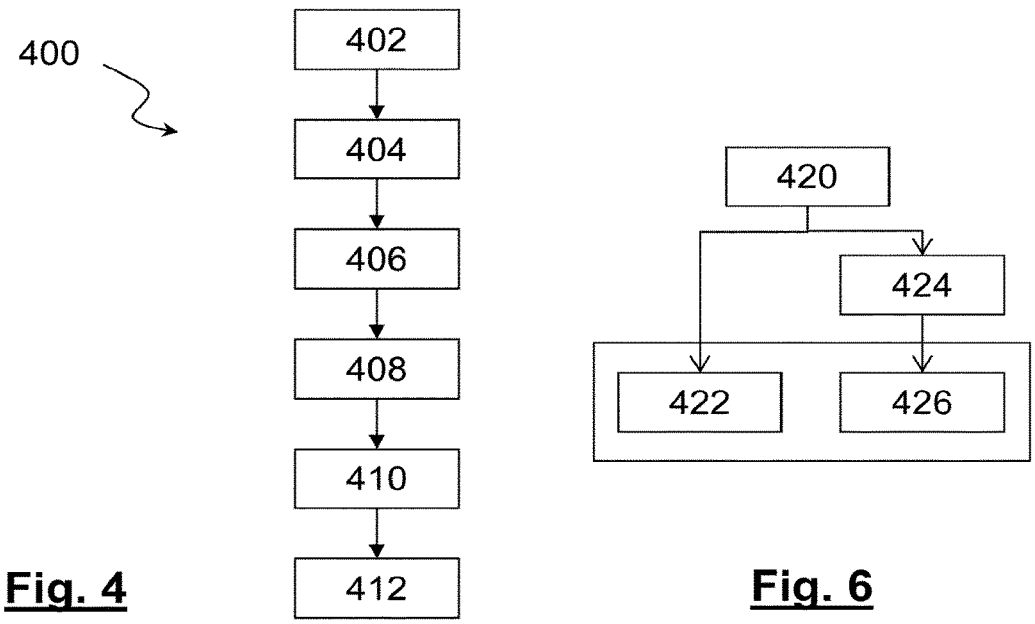
Fig. 4
Fig. 6

METHOD FOR PROVIDING TO AN EYE OF A WEARER A CUSTOMIZABLE OPHTHALMIC LENS AND ASSOCIATED ACTIVE SYSTEM OF VISION

This application is a Continuation of U.S. application Ser. No. 14/419,472 filed Feb. 3, 2015 which is a U.S. national stage application filed under 35 USC § 371 of application No. PCT/EP2013/066335 filed on Aug. 2, 2013. This application claims the priority of European application no. 12305974.3 filed Aug. 3, 2012, the entire content of which is hereby incorporated by reference.

FIELD OF THE INVENTION

The invention relates to a method for providing to an eye of a wearer a customizable ophthalmic lens and to an active system of vision adapted to carry out the steps of the said method.

The invention further relates to a computer program product and a computer readable medium.

BACKGROUND OF THE INVENTION

The invention relates to the field of active pixelated transparent optical elements, in particular to carry out an ophthalmic lens.

Within the meaning of the invention, an optical element is transparent when an object that is located on a first side of the optical element can be viewed without significant loss of contrast by an observer who is himself across the optical element. The object and the observer are each located at distance of the optical element. In other words, an image of the object is formed through the optical element with no significant loss of quality of visual perception for the observer, also called "the wearer".

It is known to carry out an optical element in the form of a transparent substrate which supports on at least one of its faces, a set of juxtaposed cells that covers at least in part this face. Substances having specific optical properties are contained in the cells, and cooperate to give optical characteristics required for a particular application to the optical component. For example, transparent substances having different refraction index can be divided in cells, so that the resulting component is a draft of lens adapted to correct visual defects. The optical properties regarding how the wavefront is modified by the optical element, also called the "dioptric function", result in the optical combination of the transparent substrate and of the set of juxtaposed cells.

The juxtaposed cells can be in the form of a film which can be adhered on the optical transparent substrate.

A final lens can then be obtained by edging the optical element according to a contour that corresponds to a frame chosen by the wearer.

Such a transparent optical element comprising a set of cells juxtaposed parallel to a surface of the optical element is generally called a pixelated optical element.

Such a transparent optical element can also have various additional optical functions, such as light absorption, polarizing capability, reinforcement of contrast capability, etc. ...

The dioptric function of the optical element can be characterized by an optical phase-shift distribution for a given monochromatic light wave which crosses the optical element.

In a general way, the transparent optical element has a surface which extends transversely compared to an optical axis. An average direction of propagation of the light wave can then be selected to be superimposed on this axis, and the optical phase-shift distribution can be given inside the said surface of the element. In case of pixelated optical elements, optical phase-shift has discrete values which are carried out in points which constitute a sampling of the usable surface of the transparent optical element. In a simplified way, optical phase-shift could be well established in a zone limited around each point of sampling, usually called cell. The value of the optical phase-shift of the element in any point of each cell would be thus equal to that of the point of sampling which is located in this cell. In a more realistic way, phase-shift is not constant inside each cell, but is intermediate between a minimal value and a maximum value which are fixed by a target function of phase-shift for this cell. The cells are contiguous in the usable surface of the optical element, and form a paving of this surface. The actual dioptric function of the pixelated transparent optical element results then from the combination of this paving with the values of optical phase-shift which are carried out in all the cells. Contiguous pixels can be separated by a wall having a width.

Moreover, it is well-known that optical phase-shift $\Delta\varphi$ for a monochromatic light wave is equal to the product of the double of number pi by the length of crossing L of each cell, and by the difference between the value n of refraction index of the transparent material which fills this cell and the value of the air index and by the inverse wavelength $\lambda$. In other words: $\Delta\varphi = 2\pi \ast L \ast (n-1)/\lambda$. A way of carrying out the transparent optical element can then consist in varying the refraction index value of fill material of the cells between different cells of the element. In this case, all the cells can have the same depth, which is measured according to the optical axis of the element.

For example, for the corrective lens application, it is advisable for different cells of the optical element to contain substances of varying refraction index such that the refraction index is adapted to vary along the surface of the optical element, according to the estimated ametropy of an eye to be corrected.

Nevertheless, one can note that optical defects, such as parasitic images generated in case of periodical repartition of pixels or blurring in case of non-periodical repartition of pixels (Voronoï structure detailed below), may appear when wearing pixelated transparent optical elements.

SUMMARY OF THE INVENTION

One aim of the present invention is to provide a method for customizing an active system of vision with enhanced visual comfort for the wearer and which is suitable to take into account varying viewing conditions that can be encountered for example in everyday life.

Another aim of the present invention is to provide a structure that allows for the provision in an optical component of one or more optical functions in a flexible and modular manner.

To achieve this, one aspect of the invention is directed to a method for providing to an eye of a wearer a customizable ophthalmic lens comprising a transparent set of electroactive cells juxtaposed to a surface of the said lens, said set of cells being activable and suitable for providing an optical phase-shift distribution function, the method comprising the steps of:

providing a reference phase-shift distribution function adapted to provide to the wearer a given dioptric function $DF(\alpha, \beta)$, said reference phase-shift distribution function being expressed with respect to a reference point $P_R$, the reference phase-shift function having a null gradient at said reference point $P_R$;

determining the actual gaze direction ($\alpha_a$, $\beta_a$) of the eye of the wearer when wearing the customizable ophthalmic lens;

choosing a reference gaze direction ($\alpha_R$, $\beta_R$) for positioning said reference point $P_R$;

calculating an actual point $P_a$ and the reference point $P_R$, said actual point $P_a$ being the intersection between the actual gaze direction of the eye of the wearer and the transparent set of electroactive cells and said reference point $P_R$ being located at the intersection between the reference gaze direction of the eye of the wearer and the transparent set of electroactive cells;

calculating a modified phase-shift distribution function by shifting the reference phase-shift distribution function according to a vector $\overrightarrow{P_R P_a}$; and activating the electroactive cells according to the said modified phase-shift distribution function so as to provide a customized ophthalmic lens to the eye of the wearer.

In the frame of the present invention, the wording "customizable lens" is used to designate a pixelated lens whose dioptric function can be modified according to the wearer's needs.

Individual cells of the pixelated optical element in which optical phase-shift is likely to take different values have a minimal size, which is in general determined by the manufacturing technique of the element. This minimal size spatially limits the sampling of a function of distribution of the optical phase-shift which is used as target to fulfill a desired dioptric function. In other words, the real optical phase-shift distribution function for the numerical element reproduces only roughly the target distribution function. The difference between these two functions of distribution constitutes a defect of the image transportation which is really produced by the optical element. Such is the case, in particular, when the target function of distribution is continuous, or continuous inside portions of the usable surface of the element.

For a given width of the walls between the pixels, this defect increases notably with the increase of the step of the paving, that is with the increase of the size of the cells. For a given size of the walls and of the cells and target function of distribution such as a given target power or astigmatism, the local difference between target and pixelated functions of distribution increase with the increase of distance to the optical function center. Then, the defects induced by pixelation increase when the direction of gaze of the wearer moves away from this center.

Thanks to the present invention, it is now possible to center the optical function of lens compared to the direction of gaze of the wearer. Centering the optical function of lens compared to the direction of gaze of the wearer can be done continuously according to the viewing behavior of the wearer by choosing $P_R$ to be the centre of the optical function of lens. The defects induced by pixelation are then significantly minimized and the quality of vision is significantly improved.

FIG. 1 schematically represents the quadratic phase-shift distribution function of a single vision pixelated lens 10. In a usual case, the quality of an image seen in direction 1, centered on the optical function of a lens, is correct for a sufficiently small size of pixels. When the direction of gaze of an eye is offset according to direction 2, the quality of image is degraded much.

Thanks to the invention, the phase-shift distribution function follows the gaze direction and thus remains always centered compared to the gaze direction of the eye. The quality of the image thus is not disturbed any more by the offsetting of the gaze direction of the eye According to an embodiment, the method is implemented by technical means, as for example by computer means controlling such a device.

According to various embodiments that can be combined according to all the possible combinations:

the transparent set of electroactive cells is juxtaposed parallel to a surface of the said lens;

the optical phase-shift distribution function of the activable cells is substantially constant within each cell;

the method further comprises the steps of:
  providing a plurality of reference phase-shift distribution functions adapted to provide to the wearer a plurality of given dioptric functions $DF_n(\alpha, \beta)$; and
  choosing a reference phase-shift distribution function among the plurality of reference phase-shift distribution functions depending on the actual gaze direction ($\alpha_a$, $\beta_a$) of the eye of the wearer when wearing the customizable ophthalmic lens;

the method further comprises the steps consisting of:
  providing a plurality of reference phase-shift distribution functions adapted to provide to the wearer a plurality of given dioptric functions $DF_n(\alpha, \beta)$; and
  determining an actual viewing distance of the eye of the wearer; and
  choosing a reference phase-shift distribution function among the plurality of reference phase-shift distribution functions depending on the actual viewing distance of the eye of the wearer.

a reference phase-shift distribution function is chosen among a list of a plurality of reference phase-shift distribution functions consisting of: at least a reference phase-shift distribution function adapted to provide to the wearer a given dioptric function $DF_{NV}(\alpha, \beta)$ suitable for near vision, at least a reference phase-shift distribution function adapted to provide to the wearer a given dioptric function $DF_{FV}(\alpha, \beta)$ suitable for far vision, at least a reference phase-shift distribution function adapted to provide to the wearer a given dioptric function $DF_{IV}(\alpha, \beta)$ suitable for intermediate vision;

the method further comprises the steps consisting of:
  providing at least three reference phase-shift distribution functions adapted to provide to the wearer a given dioptric functions respectively suitable for near vision $DF_{NV}(\alpha, \beta)$, suitable for intermediate vision $DF_{IV}(\alpha, \beta)$ and suitable for far vision $DF_{FV}(\alpha, \beta)$;
  determining an actual viewing distance of the eye of the wearer; and
  choosing a reference phase-shift distribution function among the at least three reference phase-shift distribution functions depending on the actual viewing distance of the eye of the wearer such that:
    if the actual viewing distance of the eye of the wearer is in a first range, the reference phase-shift distribution functions adapted to provide to the wearer a given dioptric functions respectively suitable for near vision $DF_{NV}(\alpha, \beta)$ is chosen;
    if the actual viewing distance of the eye of the wearer is in a second range greater than the first range, the reference phase-shift distribution functions adapted to provide to the wearer a given dioptric functions respectively suitable for intermediate vision $DF_{IV}(\alpha, \beta)$ is chosen; and if the actual viewing distance of the eye of the wearer is in a third range greater than the second range, the reference phase-shift distribution functions adapted to provide to the wearer a given dioptric functions respectively suitable for far vision $DF_{FV}(\alpha, \beta)$ is chosen;

the actual gaze direction $(\alpha_a, \beta_a)$ of the eye of the wearer when wearing the customizable ophthalmic lens is determined by tracking the pupil of the eye of the wearer thanks to an eye-tracker device.

Another aspect of the invention is directed to a computer program product comprising one or more stored sequence of instructions that is accessible to a processor and which, when executed by the processor, causes the processor to carry out the steps of the different embodiments of the preceding method.

Another aspect of the invention is directed to a computer readable medium storing one or more sequences of instructions of the preceding computer program product.

Another aspect of the invention is directed to an active system of vision for an eye of a wearer being adapted to be disposed in front of an eye of the wearer and comprising:

a customizable ophthalmic lens comprising a transparent set of electroactive cells juxtaposed to a surface of the said lens, said set of cells being activable and suitable for providing an optical phase-shift distribution function, every electroactive cell (24) having dimensions such that it can be fully comprised in a 70 µm diameter circle;

a device adapted for determining the actual gaze direction $(\alpha_a, \beta_a)$ of the eye of the wearer when wearing the customizable ophthalmic lens;

a processor operatively connected to the transparent set of electroactive cells and to the device adapted for determining the actual gaze direction, wherein the processor is configured to:

provide a reference phase-shift distribution function adapted to provide to the wearer a given dioptric function $DF(\alpha, \beta)$, said reference phase-shift distribution function being expressed with respect to a reference point $P_R$, the reference phase-shift function having a null gradient at said reference point $P_R$, choose a reference gaze direction $(\alpha_R, \beta_R)$ for positioning said reference point $P_R$, receive electrical signals dependent on the actual gaze direction of the eye from said device;

calculate an actual point $P_a$ and the reference point $P_R$, said actual point $P_a$ being the intersection between the actual gaze direction of the eye of the wearer and the transparent set of electroactive cells and said reference point $P_R$ being located at the intersection between the reference gaze direction of the eye of the wearer and the transparent set of electroactive cells;

calculate a modified phase-shift distribution function by shifting the reference phase-shift distribution function according to a vector $\overrightarrow{P_R P_a}$; and activate the electroactive cells according to the said modified phase-shift distribution function so as to provide a customized ophthalmic lens to the eye of the wearer.

The system is therefore light and very compact because it is in the form of spectacles. It can be used in everyday life, even when the user encompasses different successive viewing conditions. In particular, a person wearing a pair of spectacles of the invention retains complete freedom of movement with good viewing ability.

According to various embodiments that can be combined according to all the possible combinations:

the active system of vision further comprises another device adapted for measuring the actual viewing distance of the eye of the wearer when wearing the customizable ophthalmic lens;

the another device adapted for measuring the actual viewing distance of the eye of the wearer comprises a telemeter adapted to measure the actual viewing distance of the eye of the wearer when wearing the customizable ophthalmic lens;

a reference phase-shift distribution function is chosen among a list of a plurality of reference phase-shift distribution functions consisting of: at least a reference phase-shift distribution function adapted to provide to the wearer a given dioptric function $DF_{NV}(\alpha, \beta)$ suitable for near vision, at least a reference phase-shift distribution function adapted to provide to the wearer a given dioptric function $DF_{FV}(\alpha, \beta)$ suitable for far vision, at least a reference phase-shift distribution function adapted to provide to the wearer a given dioptric function $DF_{IV}(\alpha, \beta)$ suitable for intermediate vision;

the device adapted for determining the actual gaze direction is disposed on a face of the transparent set of electroactive cells facing the eye;

the active system of vision comprises further features wherein:

the customizable ophthalmic lens further comprises another transparent set of electroactive cells juxtaposed to a surface of the said lens, said set of cells being suitable for providing another optical phase-shift distribution function, the transparent set of electroactive cells and the another transparent set of electroactive cells are superimposed according to an optical axis of the lens;

the combination of the optical phase-shift distribution function provided by the transparent set of cells and the another optical phase-shift distribution function provided by the another transparent set of cells is adapted to provide to the wearer a resultant dioptric function; and the projection of the transparent set of electroactive cells on a surface perpendicular to the optical axis do not coincide with the projection of the another transparent set of electroactive cells on said surface perpendicular to the optical axis, such that boundaries between some of the cells adjacent to one of the transparent set of cells cut cells of the another transparent set of cells in the said projection;

the active system of vision comprises further features, wherein:

the transparent set of electroactive cells is formed by a network of walls, a set of each point forming a center of one of the cells is an irregular set of points in the surface of the lens; and a position and an orientation of each wall are determined such that the set of cells forms a Voronoï partition of the surface of the lens.

An active system of vision according to the invention can advantageously be used for several applications, for example in aviation field or in adaptive optics.

BRIEF DESCRIPTION OF THE DRAWINGS

Further features and advantages of the invention will appear from the following description of embodiments of the invention, given as non-limiting examples, with reference to the accompanying drawings listed hereunder:

FIG. 1 illustrates a phase-shift function of a standard single vision pixelated ophthalmic lens;

FIG. 4 is an exemplary flowchart illustrating steps of the method according to an embodiment of the invention for providing to an eye of a wearer a customizable ophthalmic lens;

FIG. 6 is an exemplary flowchart illustrating steps of another embodiment of the method according to the invention for providing to an eye of a wearer a customizable ophthalmic lens.

For clarity, the dimensions of the elements represented in these figures are not in proportion to the actual dimensions, nor to the ratios of the actual dimensions. In addition, identical references in the different figures denote identical elements or elements with identical functions.

DETAILED DESCRIPTION OF THE DRAWINGS

Figure 2:
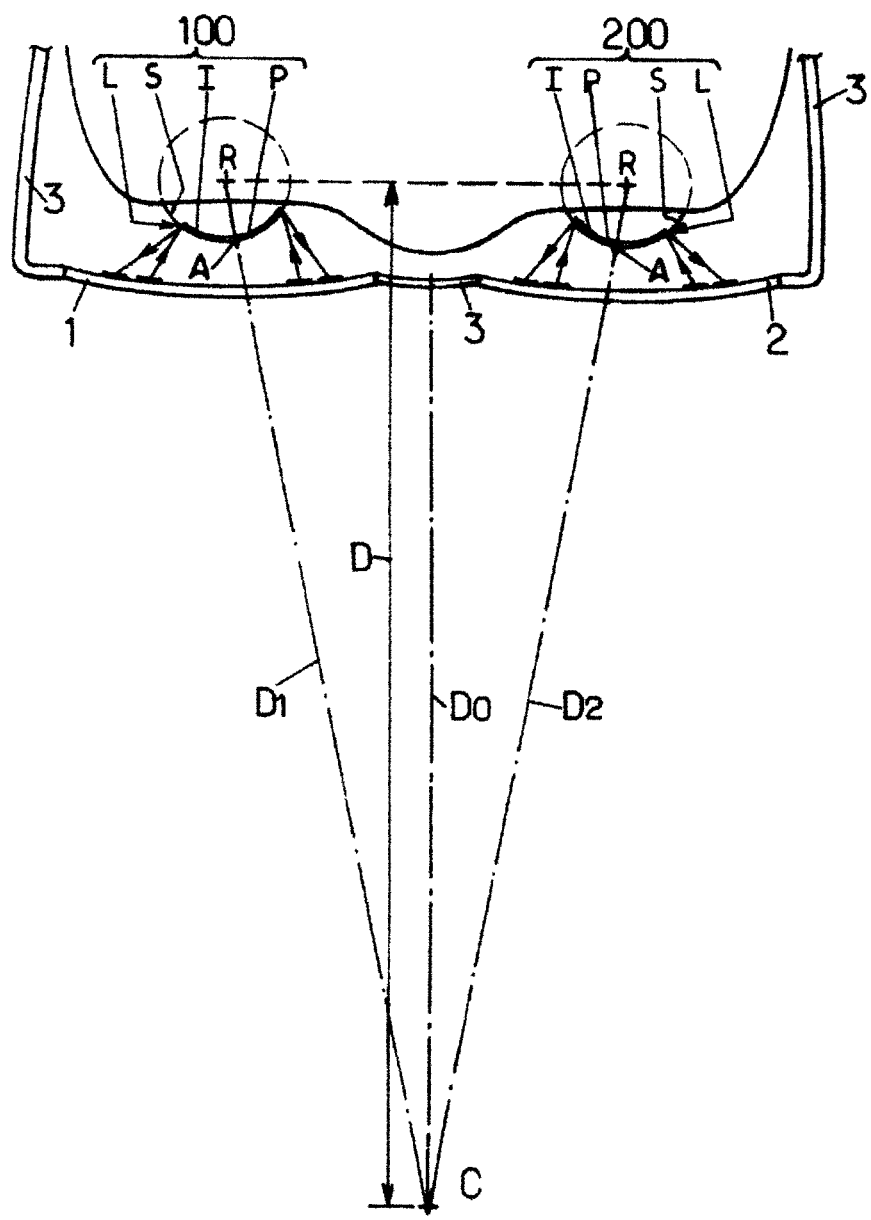
FIG. 2 is a plan view showing the use of an active vision according to an embodiment of the invention.

With reference to FIG. 2, a pair of spectacles comprises a frame 3 and two ophthalmic lenses, respectively denoted 1 and 2 for the right and left lens. The frame 3 holds the lenses 1 and 2 in relative fixed positions, and allows placing them in front of the eyes of the wearer in a manner which remains substantially constant during successive periods of use. The lenses 1 and 2 can be permanently assembled into the frame 3 using one of the assembly methods known to opticians.

The references 100 and 200 denote the wearer's eyes, 100 indicating the right eye and 200 indicating the left eye. For each of the wearer's eyes 100, 200, the references S, I, P, L and R denote respectively the sclera, the iris, the pupil, the limbus, and the center of rotation of the eye. It is known that the iris I is a circular ring having an inner diameter which is variable and which determines the size of the pupil P, and a constant outer diameter. The limbus L is the outside border of the iris L, between the iris and the sclera S. It is therefore a circle of constant size which is fixed relative to the corresponding eye when the eye is turning around its center of rotation R. Visually, the limbus L is the circular border between the white sclera S and the colored iris I.

For each eye 100, 200, the respective axis D1, D2 which passes through the center of rotation R and the center A of the corresponding pupil P is the optical axis of that eye. The center A of the pupil P is also the apex of the crystalline lens. The optical axis D1, D2, is fixed relative to the respective eye 100, 200, such that it rotates with the limbus L. The optical axes D1 and D2 of the eyes 100 and 200 converge to a common point C, which is called the point of convergence of the eyes and which is the location of a virtual object being viewed by the wearer at a given moment. The average direction D0 of the optical axes D1 and D2 is the direction of gaze of the wearer at that moment. Usually, the direction of gaze D0 connects a midpoint of the segment between the two eyes' centers of rotation R and the point of convergence C. The observation distance, which is denoted D in FIG. 2, is the distance of the point of convergence C relative to the centers of rotation R.

The invention, which is now described in specific embodiments as depicted in FIG. 2, is based on the determination of the direction of gaze D0 relatively to the face of the wearer. To achieve this, a method for determining the direction of gaze of a wearer is carried out. For example, WO 2010/130932 A1 proposes such method for determining the direction of gaze of a wearer.

In WO 2010/130932 A1, the direction of gaze D0 is determined by detecting the rotational position of each eye 100, 200 relative to the corresponding lens 1, 2. Thus each lens 1, 2 according to WO 2010/130932 A1 allows determining the angular position of the optical axis D1, D2 of the corresponding eye 100, 200. The direction of gaze D0 of the wearer is then deduced from the respective positions of the two optical axes D1 and D2.

To define the position of the optical axis of each eye, two angles are used, $\alpha$ and $\beta$, respectively called the elevation and eccentricity. The elevation a is usually identical for both eyes 100 and 200, and is the angle between each optical axis D1 or D2 and a reference plane which is horizontal when the wearer's head is vertical. The elevation value for the direction of gaze D0 is then also equal to this common value.

The eccentricity $\beta$ of the optical axis D1 or D2 of each eye is the angle between this axis and a median plane of the face, which is vertical when the wearer's head is vertical. The eccentricity $\beta$ can be considered as positive in the direction of the wearer's nose for each eye, and generally has absolute values which are distinct for the two eyes at the same moment. The difference between these two absolute values determines the convergence of the eyes, meaning the observation distance D. The azimuth value for the direction of gaze D0 is equal to half the difference of the respective eccentricity values for the two eyes, using the orientation convention of eccentricity angles just indicated.

In practice, the elevation and eccentricity of the optical axis D1, D2 of each eye 100, 200 may be determined based on the position of the limbus L of that eye.

A given gaze direction corresponds to a couple ($\alpha$, $\beta$).

It is well-known by the man skilled in the art to define dioptric function DF($\alpha$, $\beta$) adapted to correct visual defects of the wearer in this reference system of coordinates ($\alpha$, $\beta$), i.e. according to each gaze direction of the wearer.

Now, an active vision system system of vision for an eye of a wearer according to the invention will be described in details with reference to FIG. 3.

The active system of vision 20 for an eye 100, 200 of a wearer comprises a customizable ophthalmic lens 22. The active system of vision is adapted to be disposed in front of an eye of the wearer.

The customizable ophthalmic lens comprises a transparent set 24 of electroactive cells juxtaposed parallel to a surface of the said lens. Said set of cells is suitable for providing an optical phase-shift distribution function with a substantially constant value within each cell.

Preferably, each cell 26 is filled with an active electro-material such that the refraction index can vary in each pixel independently from each other under the action of an electric field induced by individual electrodes 28.

Of course, the active system of vision comprises a device 30 adapted to provide the adapted electric field.

Figure 3:
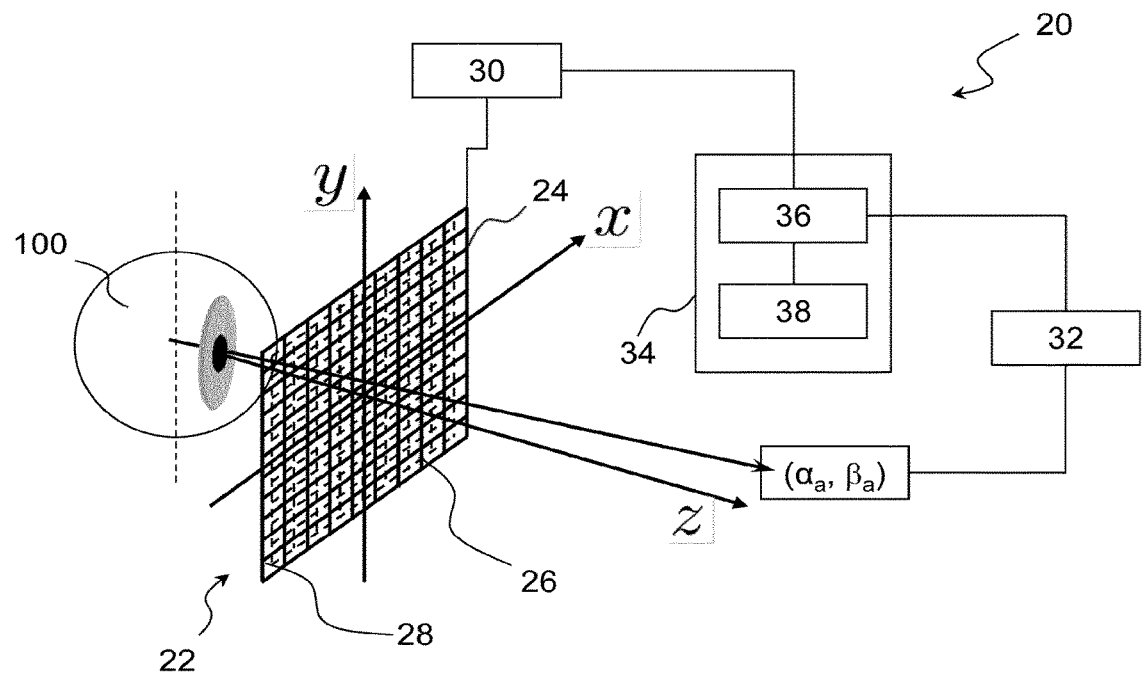
FIG. 3 is a schematic representation of an active system of vision for an eye of a wearer according to an embodiment of the invention.

FIG. 3 illustrates a pixelated lens having a plane surface. Nevertheless the surface can be unspecified. Indeed, it is well-known of the man skilled in the art methods to manufacture pixelated ophthalmic lenses having unspecified surfaces.

The set of cells is suitable for providing an optical phase-shift distribution function with a constant value within each cell.

Advantageously the set of cells covers the whole surface of the lens. This enables to provide to the wearer a good vision in a broad field of view.

Furthermore, the active system of vision for an eye of a wearer comprises a device 32 adapted for determining the actual gaze direction ($\alpha_a$, $\beta_a$) of the eye of the wearer when wearing the customizable ophthalmic lens.

For example, said device is adapted to characterize the direction of gaze of a wearer according to WO 2010/130932 A1.

The device can be disposed on a face of the transparent set of electroactive cells facing the eye.

For example, the device 32 comprises an eye-tracker system adapted to determine the actual gaze direction ($\alpha_a$, $\beta_a$) of the eye of the wearer when wearing the customizable ophthalmic lens.

Moreover, the active system of vision further comprises a control unit 34 comprising a processor 36 operatively connected to the transparent set of electroactive cells and to the device. Thus, the processor 36 is configured to receive electrical signals dependent on the actual gaze direction of the eye from said device 32.

Furthermore, the processor is configured to provide a reference phase-shift distribution function adapted to provide to the wearer a given dioptric function DF($\alpha$, $\beta$) and to choose a reference gaze direction ($\alpha_R$, $\beta_R$).

To achieve this, the control unit 34 comprises a memory 38 wherein a reference control signal is stored; the reference control signal is adapted to activate each electroactive cells to provide the reference phase-shift distribution function.

Activating the transparent set of electroactive cells requires implicitly the use of a pixelated phase-shift distribution function for driving the individual cells. Pixelisation operations can either be carried out beforehand, or either can be carried out at each change of the gaze direction. First case is advantageous in terms of calculation load; second case is advantageous in terms of precision for positioning the modified phase-shift distribution function.

More precisely, in the first case, when the set of cells comprises constant shape size cells with regular and periodic spatial repartition, the reference control signal comprises the result of pixelating operations carried out once on said reference phase-shift distribution function according to the set of electroactive cells size, shape and location. This reference control signal is then shifted depending on the gaze direction.

Advantageously, the reference control signal can be uploaded within the active system of vision through a dedicated connector or a without contact connection providing an access to the control unit 34 and the memory 38. This allows cheap update of the reference control signal in relation with a change in the need of ophthalmic correction of the wearer.

The reference gaze direction ($\alpha_R$, $\beta_R$) associated to the reference phase-shift distribution function is stored in the memory too. In operation, the processor reads, in the memory, the reference gaze direction ($\alpha_R$, $\beta_R$) associated to the reference phase-shift distribution function.

Then, the processor 36 is configured to calculate an actual point $P_a$ and a reference point $P_R$. Said actual point $P_a$ is defined by the intersection between the actual gaze direction of the eye of the wearer and the transparent set of electroactive cells, and said reference point $P_R$ is defined by the intersection between the reference gaze direction of the eye of the wearer and the transparent set of electroactive cells.

Alternatively reference point $P_R$ is stored and the reference gaze direction ($\alpha_R$, $\beta_R$) is calculated.

Moreover, the processor is configured to calculate a modified phase-shift distribution function by shifting the reference phase-shift distribution function according to a vector $\overrightarrow{P_R P_a}$ and to activate the electroactive cells according to the said modified phase-shift distribution function so as to provide a customized ophthalmic lens to the eye of the wearer. Moreover the processor is advantageously further configured to calculate a modified phase-shift distribution function by rotating the reference phase-shift distribution function according to predefined angle values so as to provide a customized ophthalmic lens to the eye of the wearer taking into account a variation of astigmatism axis direction of this eye in function of the gaze direction.

The device is adapted to carry out the steps of the method 400 according to the invention which will reference to FIG. 4.

The method comprises a step 402 for providing a reference phase-shift distribution function adapted to provide to the wearer a given dioptric function DF($\alpha$, $\beta$).

This dioptric function was pre-calculated in order to correct visual defects of the wearer. A reference phase-shift distribution function has then be calculated to provide to the wearer a given dioptric function DF($\alpha$, $\beta$) in association with a reference point $P_R$. For example, the dioptric function DF($\alpha$, $\beta$) comprises a rotational symmetry and $P_R$ is located at the symmetry center of the dioptric function DF($\alpha$, $\beta$).

Each electroactive cell is then activated according to the said calculated phase-shift distribution function.

Then, a step 404 for determining the actual gaze direction ($\alpha_a$, $\beta_a$) of the eye of the wearer when wearing the customizable ophthalmic lens is carried on. For example and preferably, the actual gaze direction ($\alpha_a$, $\beta_a$) of the eye of the wearer is determined by tracking the pupil of the eye of the wearer thanks to an eye-tracker device. As indicated before, a method according to WO 2010/130932 A1 for determining the actual gaze direction of the wearer is for example carried out.

A reference gaze direction ($\alpha_R$, $\beta_R$) is chosen during a step 406.

For example, the reference gaze direction ($\alpha_R$, $\beta_R$) is a primary gaze direction.

Furthermore, the method comprises a step 408 for calculating an actual point $P_a$ and a reference point $P_R$. The actual point $P_a$ is the intersection between the previously detected actual gaze direction of the eye of the wearer and the transparent set of electroactive cells. The reference point $P_R$ is the intersection between the reference gaze direction of the eye of the wearer and the transparent set of electroactive cells.

Then, in step 410, a modified phase-shift distribution function is calculated by shifting the reference phase-shift distribution function according to a vector $\overrightarrow{P_R P_a}$.

Moreover, the method comprises a step 412 for activating the electroactive cells according to the said modified phase-shift distribution function so as to provide a customized ophthalmic lens to the eye of the wearer.

Figure 5:
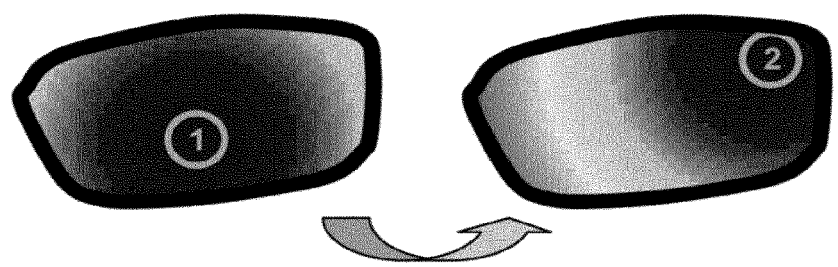
FIG. 5 illustrates the schematic principle of the method of FIG. 4.

FIG. 5 illustrates the result obtained by this method. The same function of phase of the pixelated lens of FIG. 1 is represented. Thus, when the eye of the wearer looks in direction 1, the quality of the image seen is correct since the dioptric function of lens is centered on a reference gaze direction. And when the eye of the wearer looks in a direction 2 for example passing by the periphery of lens, the same dioptric function in terms of power and astigmatism which was previously calculated to correct visual defects of the wearer is applied.

EXAMPLE

Let us consider a pixelated lens, illuminated by a 550 nm wavelength monochromatic light, whose phase-shift distribution function is quadratic, corresponding to a dioptric power P. Every pixel of this lens has a square shape, and its pitch is denoted p. The size of the walls between pixels is considered zero. The pupil of this lens is supposed to be a square A×A, with A=6 mm.

In Table 1 calculated from publication «Shape of diffraction orders of centered and decentered pixelated lenses. Appl. Opt., 49(6):1054-1064, 2010 from Marius Peloux, Pierre Chavel, François Goudail, and Jean Taboury», one shows the part of useful light η(0,0), corresponding to (0,0) diffraction order effectiveness, the remaining light being diffracted in other diffraction orders corresponding to parasitic images.

With P=2 δ, unless the pixel pitch p is very small, 5 μm for instance, one sees that η(0,0) displays non acceptable values in ophthalmic optics.

For lower values of P, say P=0.5δ, one can accept a pixel pitch up to 50 μm. Thus, the present invention deals with set of electroactive cells (pixels) whose pitch is smaller than 50 μm typically, ie. pixels having dimensions such that it can be fully comprised in a ≈70 μm diameter circle.

TABLE 1

| P (μm) | 100 | 50 | 5 |
|---|---|---|---|
| η(0, 0) | 0, 19 | 0, 57 | 1-6, 5.10$^{-3}$ |

η(0, 0),
A = 6 mm,
P = 2δ,
λ = 550 nm

The conditions leading to the results of Table 1 were obtained in a case were the lens pupil is centered with regard to the quadratic function of the lens. In order to describe the case where the pupil is decentered with regard to the quadratic function of the lens, which corresponds, in usual case, to a situation where the wearer's gaze direction is translated from the center of a pixelated lens, tests were carried out in order to quantify the interest of the invention for a lens having power equal to 2δ (diopter) and having 5 μm-square pixels, whose size of the walls between contiguous cells is considered as equal to zero.

For an horizontal translation of 10 mm of the gaze direction of the eye of a wearer compared to a fixed pupil having a 6 mm diameter, for simplicity's sake assumed to be stuck onto a plane lens and considering a quadratic phase-shift distribution function which corresponds if the wearer looks at the edge of its lens, the quantity of useful light for the wearer is equal to 0.89, corresponding to (0,0) diffraction order effectiveness. This is unacceptable in ophthalmic optics.

With the present invention, when the optical function of lens follows the gaze of the wearer, the situation is always brought back in the case of a null translation, so the quantity of useful light for the wearer is then equal to 0.994=1−1.65 10$^{-3}$, showing the interest of the active system of vision of the invention.

With a 5 δ power, this quantity of useful light is higher than ≥0.96. Consequently, it is possible to have customizable lenses according to the invention having high power.

The same reasoning applies to the cases of astigmatism phase-shift distribution functions, for which the centering of the distribution function with regard to the gaze direction is also of great interest.

In an advantageous embodiment of the present invention, one considers a phase-shift distribution function adapted for reducing the diffraction effects caused by the pixelisation, in the vicinity of this reference point $P_R$. Let's consider a phase-shift distribution function having a null gradient at a reference point $P_R$. This condition is met if one considers for instance defocus-only or astigmatism-only functions centered on the reference point $P_R$.

When the wearer gaze direction changes, the optical function, which is a pixelated version of the considered refractive function, follows so as to always keep a null gradient of the refractive phase-shift distribution function at the intersection $P_a$ of the gaze direction and the pixelated lens.

Keeping a null gradient in the refractive phase-shift distribution function at $P_a$ has a noticeable effect. Indeed, in a first order paraxial approximation, it also implies an absence of prismatic deviation at the center of the wearer field of view whatever the gaze direction. Then, in addition to the fact that the parasitic diffraction effects caused by pixelation are minimized, thanks to the centering of the phase-shift distribution function, the wearer is never affected by prismatic deviations leading to magnifying changes as it is the case in common unifocal lenses.

According to a second embodiment of the method, said method further comprising a step 420 for providing a plurality of reference phase-shift distribution functions adapted to provide to the wearer a plurality of given dioptric functions $DF_n(\alpha, \beta)$.

For example, each given dioptric functions $DF_n(\alpha, \beta)$ is adapted to provide a different power and/or astigmatism suitable for a specific activity (reading, a do-it-yourself activity . . . ).

A plurality of control signals were calculated beforehand and recorded in a memory. Each control signal is adapted to activate the whole electroactive cells in order to provide to the wearer a given dioptric functions $DF_n(\alpha, \beta)$ among the plurality of given dioptric functions $DF_n(\alpha, \beta)$.

According to a first subembodiment, this step 420 is then followed by a step 422 for choosing a reference phase-shift distribution function among the plurality of reference phase-shift distribution functions. This choice is done as a function of the actual gaze direction $(\alpha_a, \beta_a)$ of the eye of the wearer when wearing the customizable ophthalmic lens.

For example, a reference phase-shift distribution function is chosen among a list of a plurality of reference phase-shift distribution functions consisting of:

at least a reference phase-shift distribution function adapted to provide to the wearer a given dioptric function $DF_{NV}(\alpha, \beta)$ suitable for near vision, at least a reference phase-shift distribution function adapted to provide to the wearer a given dioptric function $DF_{FV}(\alpha, \beta)$ suitable for far vision, and at least a reference phase-shift distribution function adapted to provide to the wearer a given dioptric function $DF_{IV}(\alpha, \beta)$ suitable for intermediate vision.

In another example the reference phase-shift distribution functions have various astigmatism axis directions depending on the gaze direction. For example the astigmatism value and axis direction is different for near vision, far vision and intermediate vision.

According to a second subembodiment, a step 424 for determining an actual viewing distance of the eye of the wearer is carried out after the step 420 and before choosing a reference phase-shift distribution function among the plurality of reference phase-shift distribution functions depending on the actual viewing distance of the eye of the wearer in 426.

Of course, this second subembodiment is compatible with the first subembodiment. Thus, the reference phase-shift distribution function can be chosen among the plurality of reference phase-shift distribution functions as a function of both the actual gaze direction ($\alpha_a$, $\beta_a$) and/or the actual viewing distance of the eye of the wearer.

The definition of actual viewing distance has no significant influence on the way the reference phase-shift distribution function can be chosen. The actual viewing distance can be evaluated as the distance separating an object and the front face of the lens or the object and the pupil of the eye of the wearer or even the object and the center of rotation of the eye of the wearer. The choice of a definition of actual viewing distance among the previous one is mainly linked with the device adapted for measuring the actual viewing distance as discussed below. For example, at least three reference phase-shift distribution functions adapted to provide to the wearer a given dioptric functions respectively suitable for near vision $DF_{NV}(\alpha, \beta)$, suitable for intermediate vision $DF_{IV}(\alpha, \beta)$ and suitable for far vision $DF_{FV}(\alpha, \beta)$ can be provided.

Then, an actual viewing distance of the eye of the wearer is determined.

The reference phase-shift distribution function is chosen among the at least three reference phase-shift distribution functions depending on the actual viewing distance of the eye of the wearer:

if the actual viewing distance of the eye of the wearer is in a first range, for example between 0.20 and 0.45 m, the reference phase-shift distribution functions adapted to provide to the wearer a given dioptric functions respectively suitable for near vision $DF_{NV}(\alpha, \beta)$ is chosen;

if the actual viewing distance of the eye of the wearer is in a second range greater than the first range, for example between 0.45 and 1.50 m, the reference phase-shift distribution functions adapted to provide to the wearer a given dioptric functions respectively suitable for intermediate vision $DF_{IV}(\alpha, \beta)$ is chosen; and if the actual viewing distance of the eye of the wearer is in a third range greater than the second range, for example superior then 1.50 m, the reference phase-shift distribution functions adapted to provide to the wearer a given dioptric functions respectively suitable for far vision $DF_{FV}(\alpha, \beta)$ is chosen.

Here "a second range greater than the first range" must be understood as each value of the second range is greater than each value of the first range. Of course, this definition applies mutatis mutandis to the third range which is greater than the second range.

With such a method whatever the embodiments, it is possible to build ophthalmic lenses whose dioptric power can vary according to the wearer's needs, these lenses thus playing the part of a flexible crystalline lens. More generally, an advantage of the pixelation consists of what any phase-shift function can be coded in lens, constantly and at any place of lens and able to vary with time.

For presbyopic wearers, the value of the power correction is different for far vision and for near vision, due to difficulty in accommodation for near vision. The prescription thus comprises a power value for far vision and a power addition representative of the power increment between far vision and near vision. The power addition is termed the prescribed addition. Ophthalmic lenses which compensate for presbyopia are multifocal lenses, the most suitable being progressive multifocal lenses. An active system of vision according to the invention having a plurality of given dioptric functions ensures the same optical function as a multifocal lenses without the disadvantages of having astigmatism defects located in peripheral zone of the lens. Moreover, this allows broad field of view whatever the gaze direction. Thus, such active system of vision can be used to compensate for presbyopia and allows the spectacle wearer to see objects over a wide range of distances, without having to remove his or her glasses.

In order to achieve the second subembodiment of the method, the active system of vision according to a second embodiment, further comprises another device adapted for measuring the actual viewing distance of the eye of the wearer when wearing the customizable ophthalmic lens.

For example, said another device synthesizes measures of actual gaze direction of each of the two eyes of the wearer and determines from those two directions a convergence distance used for evaluating the actual viewing distance of the eyes of the wearer when wearing the customizable ophthalmic lens.

In another example, said another device comprises a telemeter adapted to measure the actual viewing distance of the eye of the wearer when wearing the customizable ophthalmic lens.

Moreover, the other device can be disposed on a face of the transparent set of electroactive cells facing the eye.

The applicant has also proposed, for example in FR1152134 and in WO 2011/144852 A1, transparent optical components having a cellular structure allowing respectively a virtual pixel size reduction (pixel superimposition) and an advantageous repartition of the defects induced by pixelation (Voronoï structures) to overcome the technological limit imposing a minimal size of the cells and so allowing to minimize the embarrassment perceived by a wearer.

As explained above, defects induced by pixelated set of cells depend on the size of the cells.

To significantly reduce these disadvantages, FR1152134 proposes a transparent optical element which comprises a plurality of layers superimposed according to an optical axis of the element. Each layer extends perpendicular to the optical axis, and consists of a paving of contiguous cells. For each layer, an optical phase-shift distribution function has a constant value inside each cell of this layer as discussed above. The dioptric function of the element results then from a combination of the respective optical phase-shift distribution functions of the layers.

The said other set of cells is suitable for providing another optical phase-shift distribution function with a constant value within each cell. The combination of the optical phase-shift distribution function provided by the transparent set of cells and the other optical phase-shift distribution function provided by the another transparent set of cells is adapted to provide to the wearer a resultant dioptric function.

The projection of the transparent set of electro-active cells on a surface perpendicular to the optical axis do not coincide with the projection of the another transparent set of electro-active cells on said surface perpendicular to the optical axis, such that boundaries between some of the cells adjacent to one of the transparent set of cells cut cells of the another transparent set of cells in the said projection.

Thus, in the surface of projection, the cells of one of the layers themselves are divided by intercellular limits of the other layer. The superimposition of the two layers then appears divided into useful cells which have dimensions lower or equal to those of the cells of each layer. In other words, the superimposition of layers enables to reduce an apparent size of useful cell to produce a given dioptric function as a result of an optimization process. For this reason, the optical phase-shift distribution function of the element of the invention can present a variation which is tiny room compared to a target distribution function, in particular compared to a target distribution function which is continuous or continuous by portions. This causes to decrease the intensity of the parasitic light which is diffracted and to leave again angularly best. This one is then less perceptible.

The invention described in FR1152134 is compatible with the present invention.

So, according to a third embodiment of the active system of vision, the customizable ophthalmic lens further comprises another transparent set of electroactive cells juxtaposed parallel to the surface of the said lens. The transparent set of electroactive cells and the other transparent set of electroactive cells are superimposed according to an optical axis of the lens.

WO 2011/144852 A1 proposes a transparent optical component having a cellular structure wherein disorder in the form and the distribution of the pixels of a pixelated lens is induced. This disorder allows transforming the parasitic orders of diffraction (corresponding to parasitic images) associated with a lens with periodic repartition of its pixels into a diffuse fog less awkward for the wearer.

The invention described in WO 2011/144852 A1 is compatible with the present invention.

So, according to a fourth embodiment, compatible with previous ones, of the active system of vision, wherein the transparent set of electroactive cells is formed by a network of walls. A position and an orientation of each wall are determined such that the set of cells forms an optimized Voronoï partition of the surface of the lens.

Furthermore, the invention also relates to a computer program product comprising one or more stored sequence of instructions that is accessible to a processor and which, when executed by the processor, causes the processor to carry out the steps of the different embodiments of the preceding methods.

The invention also proposes a computer readable medium carrying out one or more sequences of instructions of the preceding computer program product.

Unless specifically stated otherwise, as apparent from the following discussions, it is appreciated that throughout the specification discussions utilizing terms such as "evaluating", "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be noted more generally that the invention is not limited to the described and represented examples.

In particular, in the described examples the lens is single vision or multifocal. Nevertheless, the invention applies in the same manner for pixelated lenses associated with the correction of defects of astigmatism or other visual defects.

The invention claimed is:

1. A method for providing to an eye of a wearer a customizable ophthalmic lens comprising a transparent set of electroactive cells juxtaposed to a surface of the said lens, said set of cells being activable and suitable for providing an optical phase-shift distribution function, each electroactive cell having a dimension such that the electroactive cell fits within a 70 µm diameter circle, a pitch of the electroactive cells in said set of cells being smaller than 50 µm, the method comprising:

providing a reference phase-shift distribution function adapted to provide to the wearer a given dioptric function DF($\alpha$, $\beta$), said reference phase-shift distribution function being expressed with respect to a reference point $P_R$, the reference phase-shift function having a null gradient at said reference point $P_R$;

determining the actual gaze direction ($\alpha_a$, $\beta_a$) of the eye of the wearer when wearing the customizable ophthalmic lens;

choosing a reference gaze direction ($\alpha_R$, ($\beta_R$) for positioning said reference point $P_R$;

calculating an actual point $P_a$ and the reference point $P_R$, said actual point $P_a$ being the intersection between the actual gaze direction of the eye of the wearer and the transparent set of electroactive cells and said reference point $P_R$ being located at the intersection between the reference gaze direction of the eye of the wearer and the transparent set of electroactive cells;

calculating a modified phase-shift distribution function by shifting the reference phase-shift distribution function according to a vector $\overrightarrow{P_R P_a}$; and activating the electroactive cells according to the said modified phase-shift distribution function so as to provide a customized ophthalmic lens to the eye of the wearer.

2. The method for providing to an eye of a wearer a customizable ophthalmic lens according to claim 1, further comprising:

providing a plurality of reference phase-shift distribution functions adapted to provide to the wearer a plurality of given dioptric functions $DF_n(\alpha, \beta)$; and choosing a reference phase-shift distribution function among the plurality of reference phase-shift distribution functions depending on the actual gaze direction $(\alpha_a, \beta_a)$ of the eye of the wearer when wearing the customizable ophthalmic lens.

3. The method for providing to an eye of a wearer a customizable ophthalmic lens according to claim 1, further comprising:

providing a plurality of reference phase-shift distribution functions adapted to provide to the wearer a plurality of given dioptric functions $DF_n(\alpha, \beta)$;

determining an actual viewing distance of the eye of the wearer; and choosing a reference phase-shift distribution function among the plurality of reference phase-shift distribution functions depending on the actual viewing distance of the eye of the wearer.

4. The method for providing to an eye of a wearer a customizable ophthalmic lens according to claim 3, further comprising:

providing at least three reference phase-shift distribution functions adapted to provide to the wearer a given dioptric functions respectively suitable for near vision $DF_{NV}(\alpha, \beta)$, suitable for intermediate vision $DF_{IV}(\alpha, \beta)$ and suitable for far vision $DF_{FV}(\alpha, \beta)$;

determining an actual viewing distance of the eye of the wearer; and choosing a reference phase-shift distribution function among the at least three reference phase-shift distribution functions depending on the actual viewing distance of the eye of the wearer such that:

if the actual viewing distance of the eye of the wearer is in a first range, the reference phase-shift distribution functions adapted to provide to the wearer a given dioptric functions respectively suitable for near vision $DF_{NV}(\alpha, \beta)$ is chosen;

if the actual viewing distance of the eye of the wearer is in a second range greater than the first range, the reference phase-shift distribution functions adapted to provide to the wearer a given dioptric functions respectively suitable for intermediate vision $DF_{IV}(\alpha, \beta)$ is chosen; and if the actual viewing distance of the eye of the wearer is in a third range greater than the second range, the reference phase-shift distribution functions adapted to provide to the wearer a given dioptric functions respectively suitable for far vision $DF_{FV}(\alpha, \beta)$ is chosen.

5. The method for providing to an eye of a wearer a customizable ophthalmic lens according to claim 1, wherein the reference phase-shift distribution function is chosen from among a list of a plurality of reference phase-shift distribution functions consisting of: at least a reference phase-shift distribution function adapted to provide to the wearer a given dioptric function $DF_{NV}(\alpha, \beta)$ suitable for near vision, at least a reference phase-shift distribution function adapted to provide to the wearer a given dioptric function $DF_{FV}(\alpha, \beta)$ suitable for far vision, at least a reference phase-shift distribution function adapted to provide to the wearer a given dioptric function $DF_{IV}(\alpha, \beta)$ suitable for intermediate vision.

6. The method for providing to an eye of a wearer a customizable ophthalmic lens according to claim 1, wherein the actual gaze direction $(\alpha_a, \beta_a)$ of the eye of the wearer when wearing the customizable ophthalmic lens is determined by tracking the pupil of the eye of the wearer thanks to an eye-tracker device.

7. A non-transitory computer program product comprising one or more stored sequence of instructions that is accessible to a processor and which, when executed by the processor, causes the processor to carry out the steps of claim 1.

8. The method for providing to an eye of a wearer a customizable ophthalmic lens according to claim 1, wherein the lens has a power equal to 2 diopters and wherein the electroactive cells of said set of cells each form 5 µm-square pixels, said pitch of the electroactive cells in said set of cells being of 5 µm.

9. An active system of vision for an eye of a wearer, said active system of vision being adapted to be disposed in front of an eye of a wearer and comprising:

a customizable ophthalmic lens comprising a transparent set of electroactive cells juxtaposed to a surface of said lens, said set of cells being activable and suitable for providing an optical phase-shift distribution function, each electroactive cell having a dimension such that the electroactive cell fits within a 70 µm diameter circle, a pitch of the electroactive cells in said set of cells being smaller than 50 µm;

a device adapted for determining the actual gaze direction $(\alpha_a, \beta_a)$ of the eye of the wearer when wearing the customizable ophthalmic lens;

a processor operatively connected to the transparent set of electroactive cells and to the device, wherein the processor is configured to:

provide a reference phase-shift distribution function adapted to provide to the wearer a given dioptric function $DF(\alpha, \beta)$, said reference phase-shift distribution function being expressed with respect to a reference point $P_R$, the reference phase-shift function having a null gradient at said reference point $P_R$;

choose a reference gaze direction $(\alpha_R, \beta_R)$ for positioning said reference point $P_R$;

receive electrical signals dependent on the actual gaze direction of the eye from said device;

calculate an actual point $P_a$ and the reference point $P_R$, said actual point $P_a$ being the intersection between the actual gaze direction of the eye of the wearer and the transparent set of electroactive cells and said reference point $P_R$ being located at the intersection between the reference gaze direction of the eye of the wearer and the transparent set of electroactive cells;

calculate a modified phase-shift distribution function by shifting the reference phase-shift distribution function according to a vector $\overrightarrow{P_R P_a}$; and activate the electroactive cells according to the said modified phase-shift distribution function so as to provide a customized ophthalmic lens to the eye of the wearer.

10. The active system of vision according to claim 9, further comprising another device adapted for measuring the actual viewing distance of the eye of the wearer when wearing the customizable ophthalmic lens.

11. The active system of vision according to claim 10, wherein said another device comprises a telemeter adapted to measure the actual viewing distance of the eye of the wearer when wearing the customizable ophthalmic lens.

12. The active system of vision according to claim 9, wherein the reference phase-shift distribution function is chosen among a list of a plurality of reference phase-shift distribution functions consisting of: at least a reference phase-shift distribution function adapted to provide to the wearer a given dioptric function $DF_{NV}(\alpha, \beta)$ suitable for near vision, at least a reference phase-shift distribution function adapted to provide to the wearer a given dioptric function $DF_{FV}(\alpha, \beta)$ suitable for far vision, at least a reference phase-shift distribution function adapted to provide to the wearer a given dioptric function $DF_{FV}(\alpha, \beta)$ suitable for far vision, at least a reference phase-shift distribution function adapted to provide to the wearer a given dioptric function $DF_{IV}(\alpha, \beta)$ suitable for intermediate vision.

13. The active system of vision according to claim 9, wherein said device is disposed on a face of the transparent set of electroactive cells facing the eye.

14. The active system of vision according to claim 9, wherein:
   said customizable ophthalmic lens further comprises another transparent set of electroactive cells juxtaposed to a surface of the said lens, said set of cells being suitable for providing another optical phase-shift distribution function;
   the transparent set of electroactive cells and the another transparent set of electroactive cells are superimposed according to an optical axis of the lens;
   the combination of the optical phase-shift distribution function provided by the transparent set of cells and the another optical phase-shift distribution function provided by the another transparent set of cells is adapted to provide to the wearer a resultant dioptric function; and
   the projection of the transparent set of electroactive cells on a surface perpendicular to the optical axis do not coincide with the projection of the another transparent set of electroactive cells on said surface perpendicular to the optical axis, such that boundaries between some of the cells adjacent to one of the transparent set of cells cut cells of the another transparent set of cells in the projection.

15. The active system of vision according to claim 9, wherein:
   the transparent sets of electroactive cells is formed by a network of walls,
   a set of each point forming a center of one of the cells is an irregular set of points in the surface of the lens; and
   a position and an orientation of each wall are determined such that the set of cells forms a Voronoï partition of the surface of the lens.

16. The active system of vision according to claim 9, wherein the lens has a power equal to 2 diopters and wherein the electroactive cells of said set of cells each form 5 μm-square pixels, said pitch of the electroactive cells in said set of cells being of 5 μm.

* * * * *